United States Patent [19]

Steeves et al.

[11] Patent Number: 5,075,874
[45] Date of Patent: Dec. 24, 1991

[54] COMMUNICATIONS INTERFACE FOR COMPUTER OUTPUT PRINTER

[75] Inventors: John L. Steeves; Anna M. Frart, both of Rochester; Michael A. Higgins, Fairport, all of N.Y.

[73] Assignee: Eastman Kodak Company, Rochester, N.Y.

[21] Appl. No.: 335,657

[22] Filed: Apr. 10, 1989

[51] Int. Cl.⁵ .............................................. G06K 15/00
[52] U.S. Cl. ................................. 395/112; 364/939.7; 364/DIG. 2
[58] Field of Search ................................. 364/518–520, 364/235 MS, 930 MS, 940 MS, 241.9 MS, 939.7 MS, 239 MS, 239.5 MS, 239.51 MS, 239.7 MS, 239.8 MS, 239.9 MS, 939.3 MS; 400/61, 62, 70, 76

[56] References Cited

U.S. PATENT DOCUMENTS

| | | | |
|---|---|---|---|
| 4,426,166 | 1/1984 | Bowling | 395/101 |
| 4,580,242 | 4/1986 | Suzuki et al | 395/101 |
| 4,641,263 | 2/1987 | Perlman et al | 395/101 |
| 4,648,047 | 3/1987 | Berlund et al | 395/101 |

Primary Examiner—Arthur G. Evans
Attorney, Agent, or Firm—Edward Dugas

[57] ABSTRACT

A computer output printer is provided with a communications interface having a plurality of input ports. Each port can be configured to emulate a different manufacturer's printer, and is provided with a buffer to store print messages while print messages from another port are being printed.

16 Claims, 4 Drawing Sheets

COMMUNICATIONS INTERFACE FOR COMPUTER OUTPUT PRINTER

TECHNICAL FIELD

The present invention relates to a computer output printer, and more particularly to a communications interface for such a printer.

BACKGROUND ART

It is known to provide a communications interface for a computer output printer with interchangeable plug in modules that provide different communications protocols, such as RS232, Centronics etc. See U.S. Pat. No. 4,426,166 issued Jan. 17, 1984 to Bowling. It is also known to provide a printer with a communications interface having a plurality of input ports so that the printer can be shared by a number of users. For example, see the Multiuser Interface Option provided for the MT910 printer sold by Mannesmann Tally Corp., Mississauga, Ontario. The Multiuser Interface Option is a plug-in card that can be configured by the users to allow up to 4 users employing RS-232 serial input protocol to emulate any one of a variety of other manufacturers printers. A shortcoming with this interface is that it is restricted to one communications protocol (RS-232) and that while one user is using the printer, another user must wait, thereby decreasing the efficiency of the computer that is waiting to use the printer. A partial solution to this problem for a number of users using a single printer, is a multi-port print buffer card. An example of such a multi-port print buffer card is the JetShare TM print buffer card sold by INMAC Corp. Santa Clara, Calif. for use in the Hewlett-Packard LaserJet II TM printer and having four serial and one parallel input ports. Although baud rates for each port can be set independently from the front control panel of the printer, emulation of other manufacturers' printers is not provided, so that all of the computers sharing the printer must be programmed to operate that particular printer. The object of the present invention is to provide a printer with a communications interface that overcomes the shortcomings noted above.

DISCLOSURE OF THE INVENTION

The object is achieved according to the present invention by providing a computer output printer having a host computer interface that includes a plurality of input ports for receiving print messages from a plurality of host computers; means for configuring the printer to emulate a different manufacturer's printer for each port; and means to buffer input data from each port, while data received from another port is being printed.

MODES FOR CARRYING OUT THE INVENTION

Figure 1:
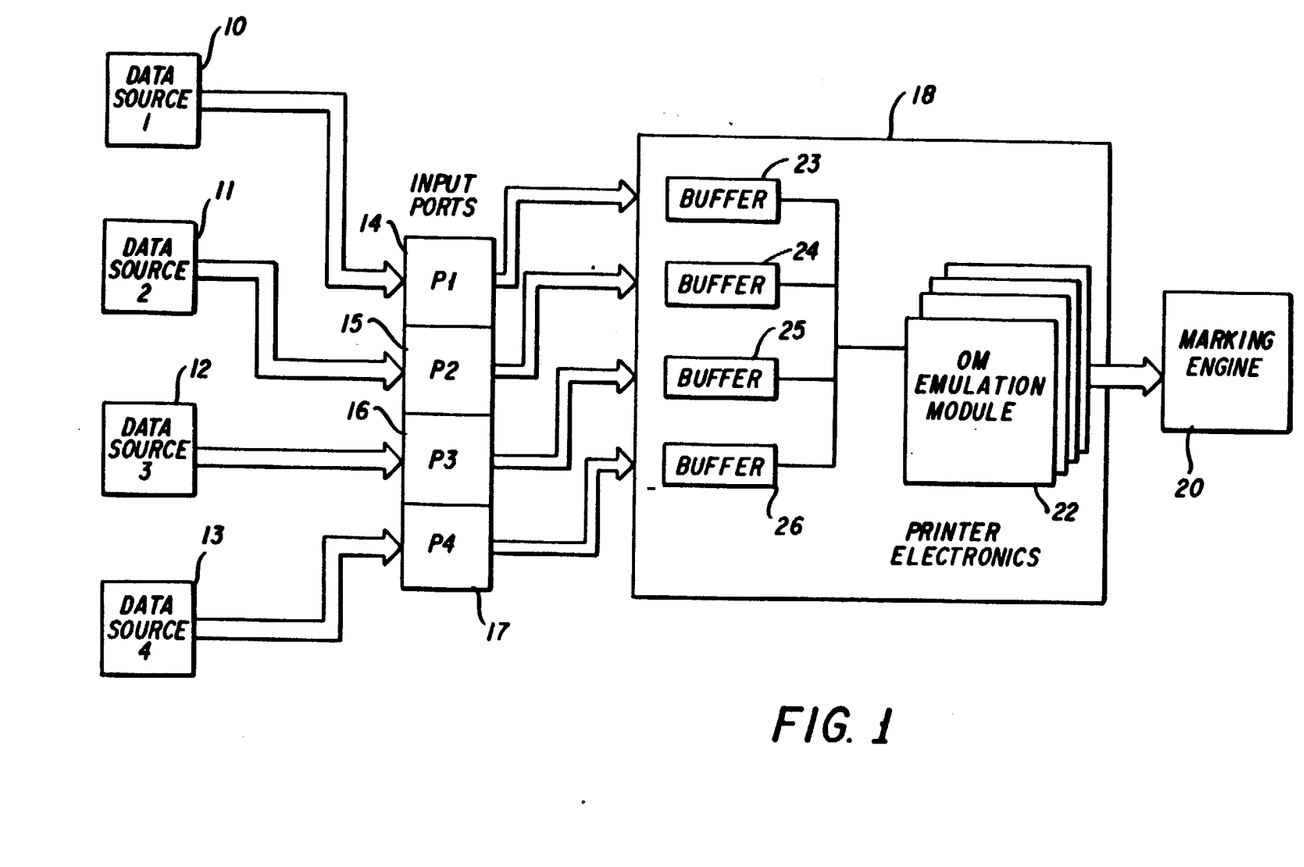
FIG. 1 is a block diagram of a printer according to an embodiment of the present invention.

FIG. 1 is a schematic diagram illustrating a printer according to the present invention. A plurality of conventional data sources 10, 11, 12, and 13 such as a plurality of personal computers programmed to drive a plurality of different manufacturers printers are connected to a corresponding plurality of input ports 14, 15, 16, and 17. Each data source supplies input signals to its input port in a standard protocol such as RS232 or Centronics, using the respective instructions set for the different printers. The printer includes printer electronics 18 that receive the data from the input ports and drives a marking engine 20. The marking engine can be for example, an ink jet, dot matrix, or electrophotographic type. According to the invention, the printer electronics includes a means for configuring the printer to emulate a different manufacturer's printer from each port. The emulation is achieved by a plurality of emulation modules 22 any one of which can be associated with any of the input ports by the printer electronics 18. According to a further aspect of the invention, the electronics provides each of the input ports with a data buffer 23, 24, 25, and 26 so that the input port can receive data from one port while the marking engine is printing data from another port. The ability to configure each port to emulate a different manufacturers printer allows the printer to be shared by a number of computers that are programmed to use different printers, without the need to modify their software. It also allows the printer to be temporarily configured for a particular job, and the configuration returned to a preset configuration after the job is finished. By providing a data buffer for each port, the efficiency of the use of the computers is improved, since a computer does not have to await the availability of the printer before sending data to print.

Figure 2:
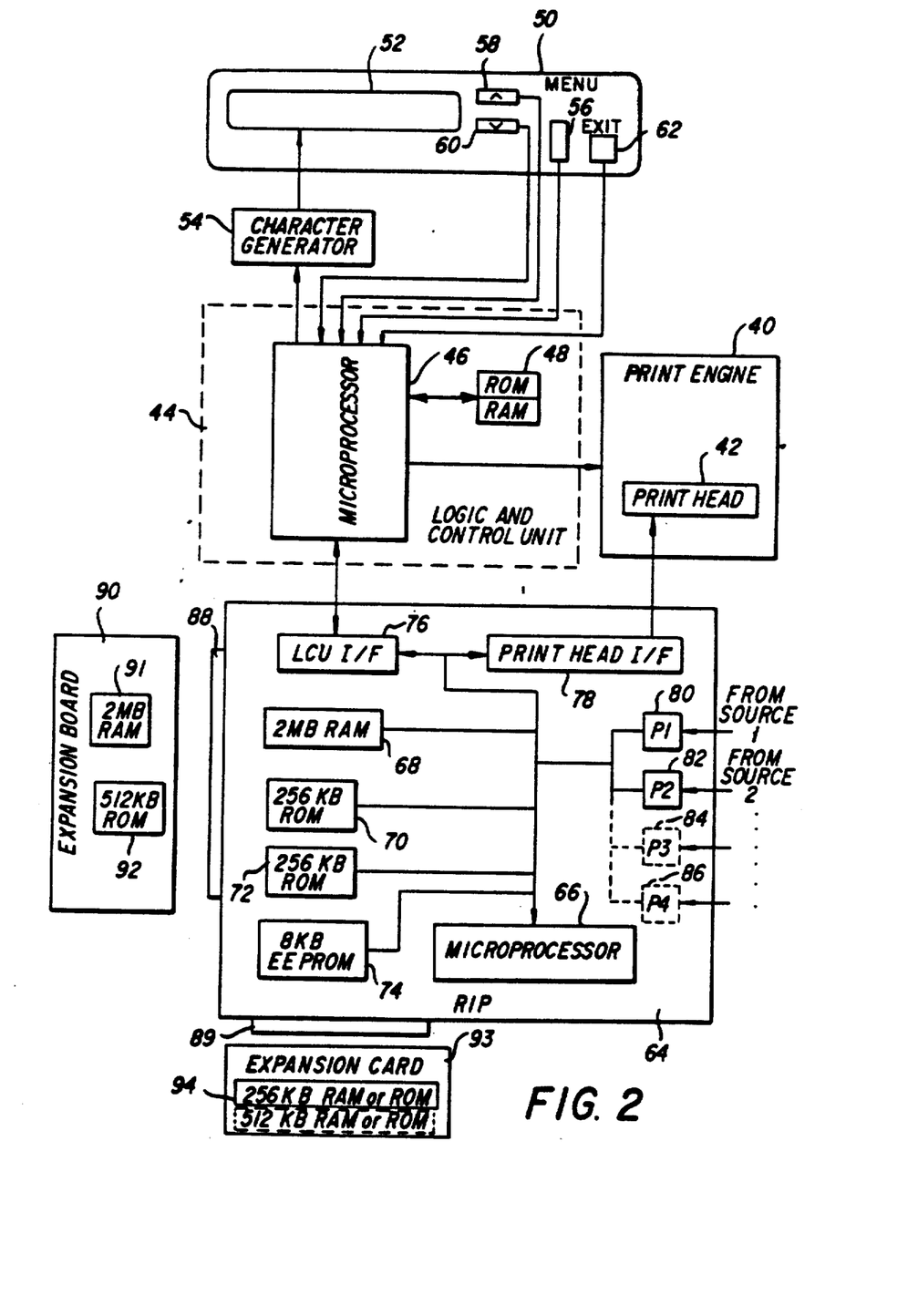
FIG. 2 is a detailed block diagram of a printer according to the present invention.

A more detailed hardware diagram of an example of a printer according to the present invention is shown in FIG. 2. The printer includes a marking engine 40 having a print head 42. The marking engine, for example, may be an electrophotographic printer with an LED print head. A microprocessor based logic and control unit 44, including a microprocessor 46 and associated random access (RAM) and read-only (ROM) memory 48 receives inputs from an operator control panel 50 and controls the operation of the marking engine 40.

The operator control panel 50 includes an alphanumeric display 52, such as a liquid crystal display panel, for displaying operator instructions and machine status. The characters displayed on the display 52 are generated by a character generator 54 associated with the operator control panel 50. The character generator 54 receives message commands coded for example in ASCII code from the microprocessor 46 in the LCU 16. When the character generator 54 receives a coded message command from the LCU 16, it drives the elements of the display 52 to display the coded message. The operator control panel 50 also includes a menu key 56 for selecting functions to be controlled from the operator control panel, a pair of up/down scroll keys 58 and 60 for scrolling messages is on the display 52, and an exit button 62 to cause the logic and control unit to exit from a control sequence displayed on the control panel. Keys and buttons 56–62 provide input signals to the LCU 44 from the operator control panel 50.

Generally, an operator selects a function to be controlled, such as the number of copies to be printed, by actuating the menu key 56. The function to be controlled is then displayed on the display 52 and the state of the function to be controlled is selected by actuating an up/down scroll key 58 or 60. Actuation of the scroll keys may scroll through a list of options which are displayed on the display 52 or may increment or decrement the displayed count such as a number of copies to be printed.

The printer also includes a raster image processor (RIP) 64 that receives coded print commands from the data sources, generates bit map patterns to produce the desired print-out, and drives the print head 42 with the bit map patterns. The raster image processor 64 includes a microprocessor 66, and associated RAM and ROM memory. The memory includes 2M RAM 68 for page buffering, 256K ROM 70 for RIP control programs, 256K ROM 72 for storing fonts, and 8K EEPROM 74 for storing port configuration data. The RIP 64 also includes an LCU interface 76, a print head driver 78, and a plurality of input ports 80, 82, 84, and 86 for simultaneously receiving the print data from external data sources. Each input port 80-86 can be a standard port such as an RS232, Centronics, AppleTalk on SCSI port.

In a presently preferred embodiment, the printer is supplied from the manufacturer with an RS232 port (e.g. port 80) and a Centronics port (e.g. port 82) and two slots that can be filled with other interface cards such as an RS232, a Centronic's interface card, an AppleTalk card or SCSI card (ports 84 and 86).

The raster image processor 64 also includes connections, 88 and 89, to attach an expansion board 90 and an expansion card 93. The expansion board 90 may contain up to 2 MB or RAM 91 and/or up to 512 KB of ROM 92. The RAM can be used as additional input buffer space or reserved for a special purpose such as the POSTSCRIPT emulation. The configuration is done automatically at power-up. The ROM can be used for additional emulations such as POSTSCRIPT, or for additional fonts or an additional font manager. The expansion card 93 may contain 256K or RAM or ROM 94, or 512K or RAM or ROM 95. The ROM can be used to contain additional emulations, additional fonts, or service diagnostic routines. The RAM is user configurable; the raster image processor allows the user to load data from the host computer that can be used as additional emulations and additional fonts.

The configuration data for from each port is stored in EEPROM 74 so that the configuration will remain intact after the machine is powered down. Each port is initially set at a factory default configuration. The configuration parameters can be changed through the operator control panel 50 or by command sequences from the host computers. A menu driven software program is provided for the host computers so that the host computers can configure a printer port to the users specifications. Each parameter has a current (not saved) value and a default (saved) value, either of which can be changed by the operator.

The port specific parameters that can be set are described below and include emulation mode, baud rate, and port timeout. The printer uses an activity timeout scheme to determine when a port has become inactive and control can be given to another host application. Since the amount of time that needs to be allowed can vary from one application to another, the timeout for each port can be set individually. The options are from 1 to 999 seconds. Other parameters may also be set depending upon the characteristics of the printer such as font identification including font characteristics such as type face, style, size and orientation, font symbol sets, paper cassette selection, number of copies per page etc.

Figure 3:
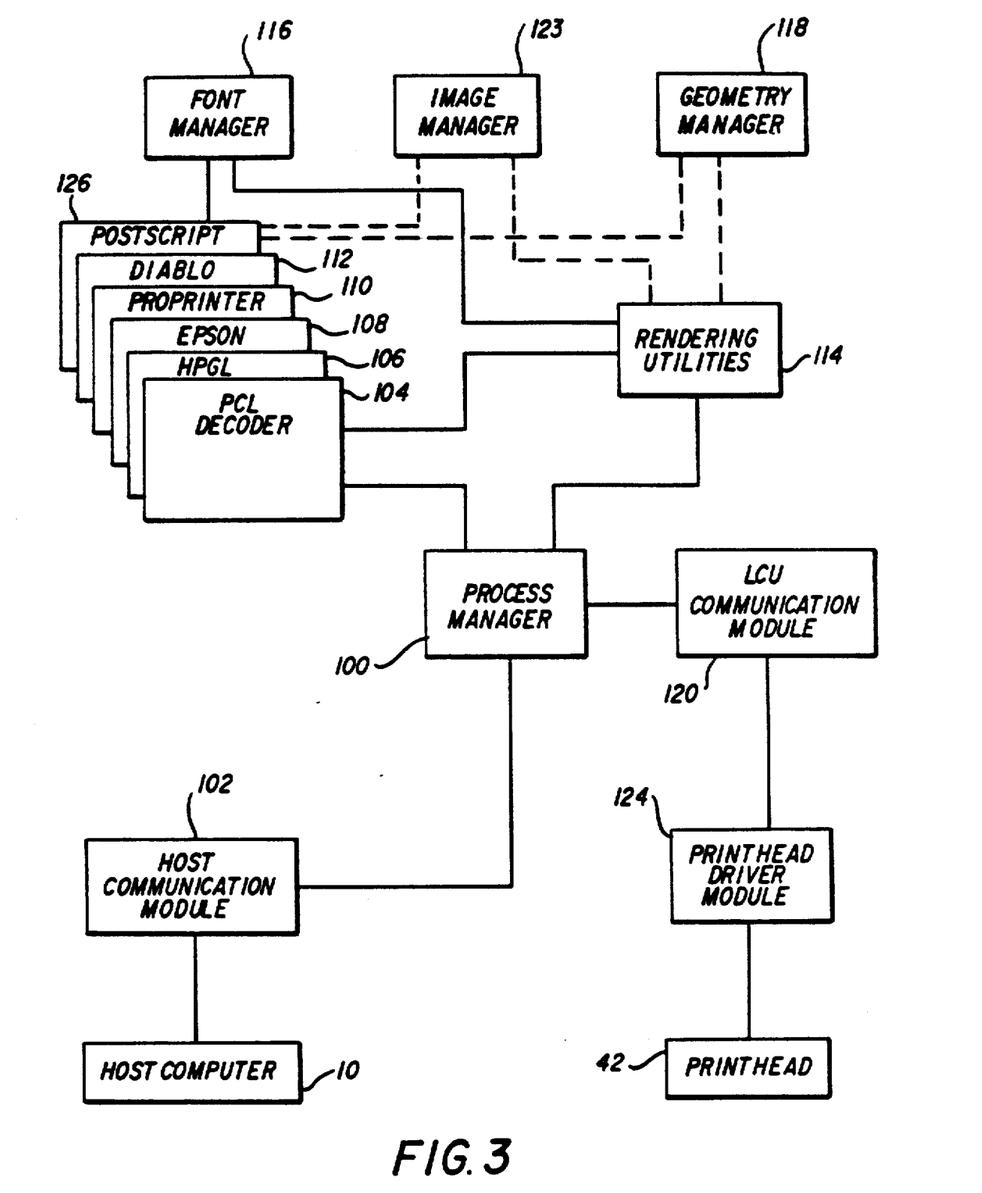
FIG. 3 is a block diagram showing the softward employed by a microprocessor for controlling the printer according to the present invention.

The other manufacturers' printers that can be emulated are: DIABLO 630; EPSON FX-80; HP LaserJet Series II (PCL); HP 7475A Plotter (HPGL); and IBM PROPRINTER. Additional emulations can be added with the memory expansion board 90, the expansion card 93, or can be directly downloaded from the host computer to reside in RAM memory 68 until the power is turned off. Printer emulation is performed in the RIP 64 by translating the printer instruction set received from the data source to a set of common internal instructions that are employed by the printer. FIG. 3 is a block diagram illustrating the software employed by the microprocessor 66 in the RIP 64 to emulate the different manufacturers printers and to control the printer. The software modules include a process manager 100; a host communications module 102; a plurality of emulation modules 104-112 (one such module for each printer emulation); a rendering utilities module 114; a font manager module 116; a geometry manager 118; a logic and control unit communications module 120; and a print head driver module 124.

Host communications module 102 receives incoming data from each host computer separately, allocates buffer storage in RAM 68 (see FIG. 2) and stores the data from the host computer in the memory. The amount of memory for each buffer in RAM 68 is allocated on an as needed basis. In this way, a number of host computers may send data into their respective buffers while another host computer's data is being printed. This feature frees up the host computers to continue with their processing as soon as possible.

The process manager 100 monitors the status of the buffers in RAM 68 and when it sees that there is data in one of the buffers, it determines which emulation is the current one for the corresponding port, referring to the values stored in EEPROM 74 and calls the appropriate emulation module 104-112.

The selected emulation module, for example, the PCL decoder 104, retrieves the input data from the buffer and translates the input instruction set to a common low-level instruction set employed by the printer. The low-level instruction set comprises a series of calls to a group of rendering utilities contained in rendering utilities module 114. The emulation module also can make calls to the font manager module 116 to request a particular font as the currently selected font.

The rendering utilities module 114 creates a bit map representation of a page in the page buffer in RAM 68 by retrieving bit maps from the font storage memory (ROM 70 in FIG. 2) and placing the bit patterns in the page buffer. The rendering utilities 114 also generates primitive graphic objects such as lines, circles, and rectangles.

When the emulation module has filled a page in the page buffer, or runs out of data, it notifies the process manager 100 that a page is ready to print. The process manager 100 notifies the LCU communications module 120 which communicates that a page is ready to print to the LCU 44 (see FIG. 2). The LCU 44 starts the marking engine 40 and notifies the LCU communications module 120 that the engine is started and to start sending data to the print head. The LCU communication module turns on the print head driver 124.

The print head driver 124 retrieves the page data from the page memory one line at a time and sends the data to the print head 42. When the page has been printed the print head driver 124 turns itself off.

According to a further improvement in the present invention, a port can be configured to interpret the POSTSCRIPT page description language. The addition of this capability is implemented by adding a POSTSCRIPT emulation module 126 shown by dotted lines in FIG. 3, an image manager module 128 and a geometry manager module 118. This capability can be supplied as an option which is added to the printer by inserting a circuit board 90 (see FIG. 2) containing memory programmed with the POSTSCRIPT modules.

The POSTSCRIPT emulation module 126 performs in a fashion similar to the other emulation modules in that it is called by the process manager 100, translates the POSTSCRIPT language to the common printer instruction set, and generates a page of bit map data in the memory. Due to the more complex nature of the POSTSCRIPT language, an image manager 128 and a geometry manager 118 are provided which provide utilities for the POSTSCRIPT emulation 126.

The image manager 128 provides utilities for rotating and scaling images. The geometry manager 118 breaks down complex graphic shapes into more primitive graphic objects such as rectangles, circles, and lines supported by the rendering utilities 114.

As noted above, the ports can be configured either from the control panel 50 or from the Host computer. Configuration from the Host computer will be described first.

At power-up, the printer will be in one of the emulation modes. To switch to the Printer Control Mode, the host computer issues the following string:

"<esc><esc>["

(where <esc> is an ASCII 1B hex)

The host may now send the specific commands using the syntax indicated in the following descriptions. Multiple commands are to be separated by semicolons. Upon completion of all desired commands, the host will issue a corresponding close bracket "]" to return the printer to the (possibly new) emulation mode. For example, to put the machine in Diablo mode and set the port timeout to 45 seconds the following string should be sent to the printer:

| ASCII: | <esc><esc>[IS1;TI45] |
|---|---|
| Hex: | 1B 1B 5B 49 53 31 3B 54 49 35 5D |

| 1.0 INSTRUCTION SET SELECTION | |
|---|---|
| Command: | Select Instruction Set |
| Syntax: | ISn (n = 1 to 5 as defined below) |
| Options: | 1 - DIABLO 630 |
| | 2 - EPSON FX-80 |
| | 3 - HP LASERJET Series II (PCL) |
| | 4 - HP7475A (HPGL) |
| | 5 - IBM PROPRINTER |
| | 20 - POSTSCRIPT |
| Example: | <esc><esc>[IS3] |
| | puts the printer in LASERJET emulation mode |

DESCRIPTION

This command allows the user to set the current instruction set. In the case of this product, all instruction sets supported are emulations of existing printers. Changing the current instruction set does not reset the printer. As noted above, POSTSCRIPT is a further improvement provided by adding a circuit board to the printer with the POSTSCRIPT input manager module. The printer will ignore a request for POSTSCRIPT if the board is not installed.

| 1.1 PORT SEPARATION PAGE | |
|---|---|
| Command: | Port Separation Page |
| Syntax: | SPn (n = 0 or 1 as defined below) |
| Options: | 0 - Disable |
| | 1 - Enable |
| Example | <esc><esc>[SP1] |
| | enables port separation pages |

DESCRIPTION

When enabled, the printer will automatically print a separator sheet whenever output from a new port is being printed. This will aid users in identifying output from different hosts.

| 1.2 PORT IDENTIFICATION | |
|---|---|
| Command: | Set Port Identification |
| Syntax: | ID@ ... @(@ ... @ = any ASCII string up to 8 characters)) |
| Example | <esc><esc>[IDPORT 1] |
| | sets the port identification to "PORT 1" |

DESCRIPTION

To further aid in distinguishing output from the different hosts, the printer will maintain an identification-/user name for each port. The name can be up to 8 characters long [Therefore, the setup menu must allow text to be entered for the port name]. It will be used when printing port separation sheets as well as when indicating required action on the Operator Control Panel. (Note: due to the command syntax, semi-colons ";" and right brackets "]" are not allowed in a port identification.)

| 1.3 PORT TIMEOUT | |
|---|---|
| Command: | Port Timeout Selection |
| Syntax: | TIn (n = 1 to 999) |
| Example | <esc><esc>[TI30] |
| | sets the port timeout to 30 seconds |

DESCRIPTION

The printer will use an activity timeout scheme to determine when a port has become inactive and control can be given to another host application. Since the amount of time that needs to be allowed can vary from one application to another, the timeout for each port can be set individually. The options are from 1 to 999 seconds.

2.0 SAVE/RESTORE CONFIGURATION

These commands allow the user to store the current configuration of the port for use as the power-up default, and alternately to recall the saved configuration.

| 2.1 SAVE CONFIGURATION | |
|---|---|
| Command: | Save Current Port Configuration |
| Syntax: | SC |
| Example: | <esc><esc>[SC] |

DESCRIPTION

The printer will maintain a copy of the port configuration table for each port in an area of non-volatile memory. At power-up, the ports will be set to these default values. This command instructs the printer to save the current port configuration as the new default. If this command is not issued, the current configuration changes will be in effect only until they are changed with subsequent commands or the unit is powered down.

| 2.2 RESTORE SAVED PORT CONFIGURATION | |
|---|---|
| Command: | Reset Printer port |
| Syntax: | RP |
| Example: | <esc><esc>[RP] |

DESCRIPTION

Clears the printer port of any features the user has temporarily selected and restores the values saved in the non-volatile memory.

| 2.3 "FACTORY" RESET | |
|---|---|
| Command: Defaults | Restore Port Configuration to "Factory" |
| Syntax: | RF |
| Example: | <esc><esc>[RF] |

DESCRIPTION

Clears the printer of any features the user has selected and resets the printers' port configuration to the values that are present when the machine is shipped from the factory.

Figure 4:
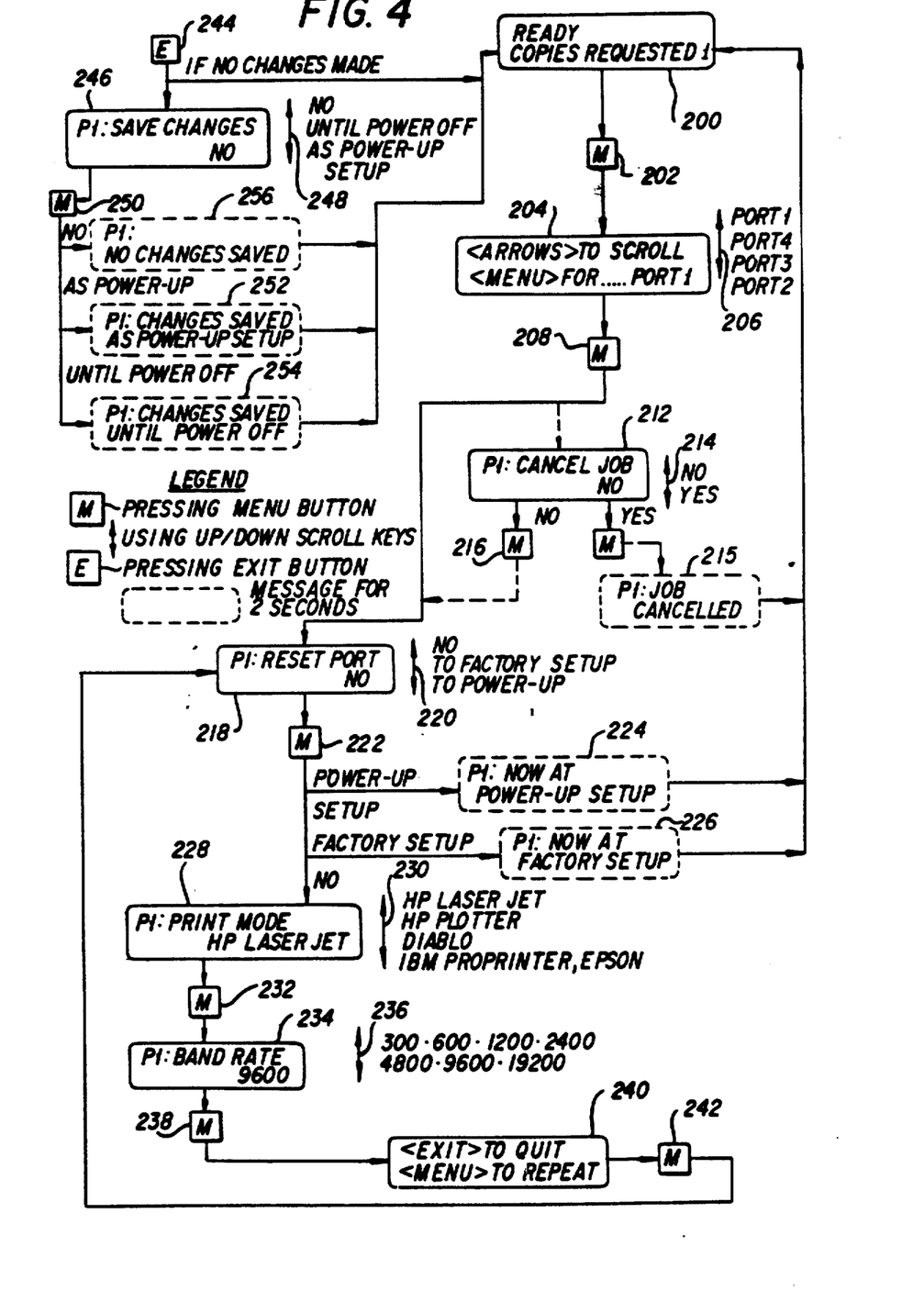
FIG. 4 is a flowchart for the operation of an operator control panel in a printer according to the present invention.

Port configuration from the Operator Control Panel 50 will now be described with reference to FIG. 4. After the printer is turned on, the display reads "READY, COPIES REQUESTED 1" (200). Pressing the menu key 202 displays "<ARROWS> TO SCROLL; <MENU> FOR PORT 1" (204). The port to be configured is selected by actuating the scroll keys 206. The display reminds the operator that the scroll keys (marked with arrows) are used to select options, while the menu key will act on the choice that is selected. Ports 3 and 4 only appear if an interface card is present in the printer for the ports. Pressing the menu key 208 with the port choice selected allows the user to configure the selected port.

The factory default setting is to configure port P1. Assuming that port P1 is selected, the menu key is pressed 208 to advance to the next item.

If there is a job pending for the selected port when the menu key is pressed, "P1: CANCEL JOB ... NO" will be displayed (212). The options selectable with the scroll key 214 are "YES" or "NO". If "YES" is selected and the menu key is pressed 216, "P1; JOB CANCELLED" (212) will be displayed. The current job will be aborted and the menu will return to "READY" (200). If "NO" is selected and the menu key is pressed 216, or if no job was pending for the selected port when the menu key was pressed, "P1: RESET PORT ... NO" (218) will be displayed.

Pressing the menu button 208 will display "P1: RESET PORT ... NO" (210). The options are "NO", "TO FACTORY SETUP" and "TO POWER-UP SETUP." One of the options is selected by actuating the scroll keys 220. Selecting "TO POWER-UP TO SETUP" and pressing the menu button 222 will reset port 1 to the settings that existed at power-up. The power-up configuration could be different than the current configuration if the operator has made temporary changes to the port configuration for a particular job. The message "P1: NOW AT POWER-UP SETUP" (224) will be displayed for about 2 seconds, and the display will return to "READY" (200).

Selecting "TO FACTORY SETUP" and pressing the menu key 222 will reset the port to the factory configuration. The message "P1: NOW AT FACTORY SETUP" (226) will be displayed for about 2 seconds and the display will return to "READY" (200). Pressing the menu key 212 with "NO SELECTED" will display "P1 PRINT MODE ... LASERJET" 228. The options selectable with the scroll keys are: HP LASERJET; HP Plotter; DIABLO; IBM PROPRINTER; and EPSON.

When one of the modes is selected 230, and the menu button is pressed 232, "P1: BAUD RATE ... 9600" is displayed (234). The communication baud rates that are selectable with the scroll keys are: 300; 600; 1200; 2400; 4800; 9600; and 19200. This option will only be displayed if the port is an RS232 or RS422 port. This option can only be selected at the control panel and cannot be controlled by the Host computer.

After a baud rate is selected (when appropriate) 236 the menu button is pressed 238 and "<EXIT> TO QUIT; <MENU> TO REPEAT" is displayed (240). This message is displayed as a reminder to the user on how to exit the setup mode. Pressing the menu key 242 will return the user to the preset port display 218, and the cycle can be repeated.

Anytime during the setup procedure, the operator may press the exit button 244. In response, "P1: SAME CHANGES ... NO" (246) is displayed. The options selectable with the scroll keys 248 are: "NO"; "UNTIL POWER OFF"; and "AS POWER-UP SETUP." Selecting the "AS POWER-UP SETUP" choice and pressing the menu button 250 will cause the printer to be configured to the selected parameters every time the printer is powered-up. The configuration data is stored in RIP 64 in EEPROM 74. The display will show "P1: CHANGES SAVED AS POWER-UP SETUP" (252) for about 2 seconds, then return to "READY" 200.

If the menu button is pressed 250 when "UNTIL POWER OFF IS SELECTED", the selected configuration will remain in effect until the printer is turned off. The display will show "P1: CHANGES SAVED UNTIL POWER OFF" 254 for about 2 seconds, then return to "READY" 200.

When the printer is turned on again, it will use the configuration data stored in the EEPROM 74 which is designated as the "AS POWER-UP SETUP." If the menu key is pressed 250 while "NO" is selected, none of the changes will be saved; the display will show "P1: NO CHANGES SAVED" (256) for about 2 seconds and then return to "READY" (200).

Advantages and Industrial Applicability

The present invention is useful in a computer output printer, and is advantageous in that a printer provided with an interface according to the present invention may be shared by different computers having programs for driving different manufacturer's printers, without the need for reprogramming the computers. The invention has the further advantage that one computer can send print instructions to the printer, while print instructions from another computer are being printed, thereby increasing the efficiency of the computers connected to the printer.

We claim:

1. In a computer output printer, a host computer interface comprising:
   a plurality of input/output ports for simultaneously receiving print messages from a plurality of host computers;
   printer configuration means for configuring the printer differently for each of said input/output ports to emulate a plurality of other manufacturer's printers;
   buffer means associated with each port for receiving and storing print messages from a plurality of ports while print messages from another port are being printed; and
   an operator control panel having a display for displaying configuration parameters and operator input means for specifying port specific configuration parameters.

2. The apparatus claimed in claim 1, wherein one of said input ports is a parallel port.

3. The apparatus claimed in claim 1, wherein one of said input ports is a serial port.

4. In a computer output printer, a host computer interface comprising:
   a plurality of input/output ports for simultaneously receiving print messages from a plurality of host computers, the number of input ports being a variable determined by placing interface cards in an input port rack;
   means for sensing the number of input ports and controlling a configuration display based upon the number sensed
   printer configuration means for configuring the printer differently for each of said input/output ports to emulate a plurality of other manufacturer's printers; and
   buffer means associated with each port for receiving and storing print messages from a plurality of ports while print messages from another port are being printed.

5. In a computer output printer, a host computer interface comprising:
   a plurality of input/output ports for simultaneously receiving print messages from a plurality of host computers;
   printer configuration means for configuring the printer differently for each of said input/output ports to emulate a plurality of other manufacturer's printers;
   buffer means associated with each port for receiving and storing print messages from a plurality of ports while print messages from another port are being printed; and
   an operator control panel having a display for displaying configuration parameters and operator input means for specifying port specific configuration parameters, said port specific parameters including printer emulation mode and baud rate, timeout and separator pages.

6. The apparatus claimed in claim 1, wherein said operator input means includes a menu key used to select a parameter to be configured, and up/down scroll keys used to select the parameter value.

7. Apparatus claimed in claim 1, wherein said printer configuration means includes emulation modes which include LASERJET, EPSON, IBM PROPRINTER, DIABLO, and HP Plotter.

8. The apparatus claimed in claim 1, wherein said printer includes a raster image processor including a microprocessor and associated random access memory, and wherein said buffer means resides in said random access memory.

9. In a computer output printer, a host computer interface comprising:
   a plurality of input/output ports for simultaneously receiving print messages from a plurality of host computers;
   printer configuration means for configuring the printer differently for each of said input/output ports to emulate a plurality of other manufacturer's printers;
   buffer means associated with each port for receiving and storing print messages from a plurality of ports while print messages from another port are being printed; and
   POSTSCRIPT translator means for translating a generic document description to a printer specific description.

10. In a computer output printer, a host computer interface comprising:
    a plurality of input/output ports for simultaneously receiving print messages from a plurality of host computers;
    printer configuration means for configuring the printer differently for each of said input/output ports to emulate a plurality of other manufacturer's printers;
    buffer means associated with each port for receiving and storing print messages from a plurality of ports while print messages from another port are being printed; and
    port configuration means for configuring the input ports by command sequences from the host computer.

11. The apparatus claimed in claim 10, wherein said printer configuration means for configuring the printer includes a port configuration table stored in a nonvolatile memory and at power-up, the printer configuration means sets the port configuration to values stored in the table.

12. The apparatus claimed in claim 7, further including memory expansion means for adding random access memory to said printer for storing further emulation modes.

13. In a computer output printer, a host computer interface comprising:
    a plurality of input/output ports for simultaneously receiving print messages from a plurality of host computers, one of said ports comprising a network communication port;

printer configuration means for configuring the printer differently for each of said input/output ports to emulate a plurality of other manufacturer's printers; and buffer means associated with each port for receiving and storing print messages from a plurality of ports while print messages from another port are being printed.

14. The apparatus claimed in claim 13, wherein one of said ports is an SCSI port.

15. The apparatus claimed in claim 12, further comprising means for storing data from a host computer in said random access memory.

16. The apparatus claimed in claim 15, wherein said data is emulation mode data and font data.

* * * * *